United States Patent [19]

Fuchs et al.

[11] Patent Number: 4,997,635
[45] Date of Patent: Mar. 5, 1991

[54] PREPARATION OF CRYSTALLINE HYDROXYLAMMONIUM SULFATE HAVING A LOW AMMONIUM SULFATE CONTENT

[75] Inventors: Hugo Fuchs, Ludwigshafen; Gerald Neubauer, Weinheim; Josef Ritz, Ludwigshafen; Franz-Josef Weiss, Neuhofen, all of Fed. Rep. of Germany

[73] Assignee: BASF Aktiengesellschaft, Ludwigshafen, Fed. Rep. of Germany

[21] Appl. No.: 521,031

[22] Filed: May 9, 1990

[30] Foreign Application Priority Data

May 19, 1989 [DE] Fed. Rep. of Germany ....... 3916320

[51] Int. Cl.$^5$ .............................................. C01B 21/093
[52] U.S. Cl. ..................................................... 423/388
[58] Field of Search ................................. 423/387, 388

[56] References Cited

U.S. PATENT DOCUMENTS

| | | |
|---|---|---|
| 2,989,553 | 6/1961 | Modderman et al. |
| 4,147,623 | 4/1979 | Koff et al. ............ 423/387 |
| 4,166,842 | 9/1979 | Tunick et al. ......... 423/388 |
| 4,202,765 | 5/1980 | Koff et al. ............ 423/387 |
| 4,725,360 | 2/1988 | Fuchs et al. .......... 423/387 |

FOREIGN PATENT DOCUMENTS 2423982 11/1975 Fed. Rep. of Germany.
14640 4/1974 Japan ..................................... 423/387

Primary Examiner—Wayne A. Langel
Attorney, Agent, or Firm—Keil & Weinkauf

[57] ABSTRACT

Crystalline hydroxylammonium sulfate is prepared by a process which comprises the following steps:
(a) Bringing an aqueous solution which contains from 0.02 to 0.3 part by weight of ammonium sulfate and from 0.02 to 0.2 part by weight of sulfuric acid per part by weight of hydroxylammonium sulfate into contact with a basic ion exchanger and obtaining a solution which has a pH of from 3.0 to 4.0,
(b) separating off the basic ion exchanger from the aqueous hydroxylammonium sulfate solution,
(c) evaporating down the resulting aqueous hydroxylammonium sulfate solution under reduced pressure at <100° C. and obtaining a concentrated hydroxylammonium sulfate solution,
(d) crystallizing out not more than 70% by weight of the hydroxylammonium sulfate present in the aqueous solution to give crystalline hydroxylammonium sulfate and a mother liquor, and
(e) isolating and crystalline hydroxylammonium sulfate from the mother liquor.

7 Claims, No Drawings

PREPARATION OF CRYSTALLINE HYDROXYLAMMONIUM SULFATE HAVING A LOW AMMONIUM SULFATE CONTENT

In the preparation of hydroxylammonium sulfate by catalytic hydrogenation of nitric oxide with hydrogen in aqueous sulfuric acid in the presence of noble metal catalysts, an aqueous hydroxylammonium sulfate solution which contains ammonium sulfate as a byproduct and additionally contains unconverted sulfuric acid is obtained. Such solutions are unsuitable for the preparation of crystalline hydroxylammonium sulfate, owing to the content of free sulfuric acid. If the free sulfuric acid is neutralized, for example with ammonia, before the aqueous solution is evaporated down, additional ammonium sulfate is obtained, with the result that, during crystallization, the content of ammonium sulfate in the crystalline hydroxylammonium sulfate is increased. In order to limit the content of ammonium sulfate in the crystalline hydroxylammonium sulfate to, for example, 1% by weight, it has therefore been possible to crystallize out only one third of the amount of hydroxylammonium sulfate present during the crystallization, and the remaining solution has had to be used for other purposes. This imposes a considerable limit on the crystallization capacity, apart from the fact that substantial amounts of mother liquor are obtained.

DE-A 2 423 982 describes a process in which crystalline hydroxylammonium sulfate is obtained from solutions, which additionally contain ammonium sulfate, by fractional crystallization and recrystallization. This process has the disadvantage that it is technically very involved and furthermore does not solve the problem of the capacity limitation in the crystallization.

It is an object of the present invention to provide a process for the preparation of crystalline hydroxylammonium sulfate from solutions which contain, in addition to hydroxylammonium sulfate, ammonium sulfate and sulfuric acid, in which crystalline hydroxylammonium sulfate having a low ammonium sulfate content is obtained, corrosion problems are avoided and the capacity of the crystallization is improved.

We have found that this object is achieved by a process for the preparation of crystalline hydroxylammonium sulfate having a low ammonium sulfate content from aqueous solutions which, in addition to hydroxylammonium sulfate, also contain ammonium sulfate and sulfuric acid, the said process comprising the following steps:

(a) Bringing an aqueous solution which contains from 0.02 to 0.3 part by weight of ammonium sulfate and from 0.02 to 0.2 part by weight of sulfuric acid per part by weight of hydroxylammonium sulfate into contact with a basic ion exchanger and obtaining a solution which has a pH of from 3.0 to 4.0, (b) separating off the basic ion exchanger from the aqueous hydroxylammonium sulfate solution, (c) evaporating down the resulting aqueous hydroxylammonium sulfate solution under reduced pressure at <100° C. and obtaining a concentrated hydroxylammonium sulfate solution, (d) crystallizing out not more than 70% by weight of the amount of hydroxylammonium sulfate present in the aqueous solution to give crystalline hydroxylammonium sulfate and a mother liquor, and (e) isolating the crystalline hydroxylammonium sulfate from the mother liquor.

The novel process has the advantages that crystalline hydroxylammonium sulfate having a low content of ammonium sulfate is obtained, the crystallization capacity is increased, corrosion problems are avoided and the process can readily be carried out continuously.

According to the invention, aqueous solutions which contain from 0.02 to 0.3, in particular from 0.04 to 0.1, part by weight of ammonium sulfate and from 0.02 to 0.2, in particular from 0.03 to 0.08, part by weight of sulfuric acid per part by weight of hydroxylammonium sulfate are used. As a rule, the aqueous solutions used contain from 20 to 30, in particular from 23 to 28, % by weight of hydroxylammonium sulfate. Suitable starting solutions are obtained, for example, by catalytic hydrogenation of nitric oxide with hydrogen in aqueous sulfuric acid in the presence of a noble metal, in particular a platinum catalyst. A suitable process is described in, for example, DE-C 1 177 118. A typical solution contains, for example, from 24 to 26% by weight of hydroxylammonium sulfate, from 1.5 to 2% by weight of ammonium sulfate and from 1.2 to 1.5% by weight of sulfuric acid.

In stage (a), the starting solution is brought into contact with a basic ion exchanger, and a solution having a pH of from 3.0 to 4.0, in particular from 3.2 to 3.8, is obtained. A temperature of from 10° to 50° C. is advantageously maintained during this procedure. Weakly basic ion exchangers have proven particularly suitable. Such ion exchangers are, for example, crosslinked polymers containing primary, secondary or tertiary amino groups. Suitable ion exchangers are, for example, composed of crosslinked polystyrene or polyacrylate which contains primary, secondary or tertiary amino groups. The ion exchangers used are converted into their active form in a conventional manner before being used, by treatment with aqueous ammonia solution.

As a rule, initially basic ion exchangers are used in excess, based on the content of free sulfuric acid, after which additional starting solution is added until the total solution has reached the abovementioned pH. The solution thus obtained generally contains from 0.02 to 0.3 part by weight of ammonium sulfate and up to 0.02 part by weight of sulfuric acid per part by weight of hydroxylammonium sulfate.

In stage (b), the basic ion exchanger is separated from the aqueous hydroxylammonium sulfate solution, for example by filtration.

In a preferred technical embodiment, stages (a) and (b) are combined, the steps of bringing the starting solution into contact with the basic ion exchanger and separation of the latter being carried out simultaneously. Fixed-bed ion exchangers are used, for example in an ion exchange column, and starting solution is passed over from top to bottom or from bottom to top until the total amount of starting solution passed through has reached the abovementioned pH. Thereafter, the ion exchange column is regenerated with aqueous ammonia solution. Advantageously, a plurality of columns, for example from 2 to 6 columns, are used, the said columns being treated with starting solution and regenerated alternately.

The resulting aqueous hydroxylammonium sulfate solution having the abovementioned pH is evaporated down in stage (c) under reduced pressure at below 100° C., a concentrated hydroxylammonium sulfate solution being obtained. Evaporation is advantageously carried out to the saturation concentration of the hydroxylammonium sulfate. As a rule, the temperature is kept below 100° C., for example from 50° to 90° C., and reduced pressure, e.g. from 120 to 670 mbar, is used.

In stage (d), not more than 70% by weight of the amount of hydroxylammonium sulfate present in the aqueous solution are crystallized out from the resulting highly concentrated, in particular saturated, hydroxylammonium sulfate solution, crystalline hydroxylammonium sulfate and a mother liquor being obtained. If the ammonium sulfate content of the crystalline hydroxylammonium sulfate is to be particularly low, for example not more than 0.5% by weight, advantageously up to 40% by weight of the amount of hydroxylammonium sulfate present in the aqueous solution is crystallized out. Crystallization is effected, for example, by cooling the aqueous hydroxylammonium sulfate solution.

In a process preferred in industry, steps (c) and (d) are combined, the aqueous hydroxylammonium sulfate solution being evaporated down under the stated conditions, a concentrated hydroxylammonium sulfate solution being obtained, and a slurry of crystalline hydroxylammonium sulfate being produced by further evaporation. The amount of water evaporated is replenished continuously by adding aqueous hydroxylammonium sulfate solution. Such a continuous process is advantageously carried out in evaporator crystallizers, for example those based on the circulation principle (Oslo crystallizer). Here, the slurry of the hydroxylammonium sulfate crystals settles out at the lower end and is removed continuously.

In stage (e), the crystalline hydroxylammonium sulfate thus obtained is separated from the mother liquor, for example by filtration and in particular by centrifuging. The adhering mother liquor is advantageously removed by washing with water, the washwater in turn being recycled to stage (c) or remaining in the mother liquor.

The process according to the invention is carried out, for example, by passing the abovementioned hydroxylammonium sulfate-containing starting solution over an ion exchange column containing a basic ion exchanger, until the total amount of the hydroxylammonium sulfate solution emerging has a pH of from 3.0 to 4.0, after which the resulting solution is evaporated down at below 100° C. under reduced pressure with deposition of not more than 70% of the amount of hydroxylammonium sulfate present in the solution, and crystalline hydroxylammonium sulfate is isolated from the slurry containing crystalline hydroxylammonium sulfate.

Hydroxylammonium sulfate having a low ammonium sulfate content, as obtainable by the process of the invention, is suitable for the preparation of flotation aids, for use in the photographic industry and for the production of crop protection agents and drugs.

The Example which follows illustrates the process of the invention.

EXAMPLE 200 ml of a basic ion exchanger based on crosslinked polystyrene containing amino groups were introduced into an ion exchange column having a diameter of 30 mm and a height of 300 mm, and the ion exchanger was regenerated by treatment with 3% strength by weight aqueous ammonia solution and then washed with water. A hydroxylammonium sulfate solution which contained 254 g of hydroxylammonium sulfate, 13.0 g of free sulfuric acid and 18.6 g of ammonium sulfate per kg was then passed over the basic ion exchanger. The solution emerging from the ion exchange column initially had a pH of about 8. The pH dropped back again slowly. The feed was maintained until the total amount of solution which had passed through had a pH of 3.35. The solution thus obtained contained 236 g of hydroxylammonium sulfate and 17.0 g of ammonium sulfate per kg. Free sulfuric acid was no longer detectable.

The resulting sulfuric acid-free hydroxylammonium sulfate solution was evaporated down at ~60° C. under 190 mbar to give a saturated solution, and 50% of the hydroxylammonium sulfate was precipitated in crystalline form by cooling to 20° C. and was isolated. The crystalline hydroxylammonium sulfate thus obtained contained 0.6% by weight of ammonium sulfate.

COMPARATIVE EXAMPLE

The hydroxylammonium sulfate solution used in the Example and containing 254 g of hydroxylammonium sulfate per kg, 13.0 g of free sulfuric acid and 18.6 g of ammonium sulfate was neutralized with NH$_3$ until free sulfuric acid was no longer detectable.

The hydroxylammonium sulfate solution thus obtained and 50% of the hydroxylammonium sulfate was again precipitated in crystalline form and isolated. The crystalline hydroxylammonium sulfate thus obtained contained 1.1% by weight of ammonium sulfate.

We claim:

1. A process for the preparation of crystalline hydroxylammonium sulfate having a low ammonium sulfate content from an aqueous solution which, in addition to hydroxylammonium sulfate, contains ammonium sulfate and sulfuric acid, the said process comprising the following steps:
   (a) bringing an aqueous solution which contains from 0.02 to 0.3 part by weight of ammonium sulfate and from 0.02 to 0.2 part by weight of sulfuric acid per part by weight of hydroxylammonium sulfate into contact with a basic ion exchanger and obtaining a solution which has a pH of from 3.0 to 4.0,
   (b) separating off the basic ion exchanger from the aqueous hydroxylammonium sulfate solution,
   (c) evaporating down the resulting aqueous hydroxylammonium sulfate solution under reduced pressure at <100° C. and obtaining a concentrated hydroxylammonium sulfate solution,
   (d) crystallizing out not more than 70% by weight of the amount of hydroxylammonium sulfate present in the aqueous solution to give crystalline hydroxylammonium sulfate and a mother liquor, and
   (e) isolating the crystalline hydroxylammonium sulfate from the mother liquor.

2. A process as defined in claim 1, wherein a hydroxylammonium sulfate solution obtained by catalytic hydrogenation of nitric oxide with hydrogen in aqueous sulfuric acid in the presence of a noble metal catalyst is used as a starting material.

3. A process as defined in claim 1, wherein a weakly basic ion exchanger is used.

4. A process as defined in claim 1, wherein the aqueous hydroxylammonium sulfate solution is passed through a fixed-bed basic ion exchanger until the total amount of the solution obtained has a pH of from 3.0 to 4.0.

5. A process as defined in claim 1, wherein, in stage (c), the hydroxylammonium sulfate solution is evaporated down at from 50° to 90° C. under from 120 to 670 mbar.

6. A process as defined in claim 1, wherein crystalline hydroxylammonium sulfate is precipitated during the evaporation.

7. A process as defined in claim 1, wherein up to 40% by weight of the hydroxylammonium sulfate present in the aqueous solution is precipitated in crystalline form.

* * * * *